(12) United States Patent
Fuse et al.

(10) Patent No.: US 10,527,817 B2
(45) Date of Patent: Jan. 7, 2020

(54) LENS DRIVE DEVICE, CAMERA MODULE, AND CAMERA MOUNTED DEVICE HAVING AUTOFOCUS FUNCTION

(71) Applicants: Ryo Fuse, Tokyo (JP); Keiichi Sato, Tokyo (JP)

(72) Inventors: Ryo Fuse, Tokyo (JP); Keiichi Sato, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 134 days.

(21) Appl. No.: 15/577,563

(22) PCT Filed: May 26, 2016

(86) PCT No.: PCT/JP2016/002556
§ 371 (c)(1),
(2) Date: Nov. 28, 2017

(87) PCT Pub. No.: WO2016/194346
PCT Pub. Date: Dec. 8, 2016

(65) Prior Publication Data
US 2018/0172946 A1 Jun. 21, 2018

(30) Foreign Application Priority Data
May 29, 2015 (JP) .................................. 2015-109784

(51) Int. Cl.
G02B 27/64 (2006.01)
G02B 7/09 (2006.01)
G03B 5/00 (2006.01)
G03B 13/36 (2006.01)
(Continued)

(52) U.S. Cl.
CPC ................. *G02B 7/09* (2013.01); *G02B 7/08* (2013.01); *G02B 27/646* (2013.01); *G03B 5/00* (2013.01);
(Continued)

(58) Field of Classification Search
CPC .. G02B 27/64; G02B 27/646; H04N 5/23248; H04N 5/23264; H04N 5/2328; H04N 5/23287
(Continued)

(56) References Cited

U.S. PATENT DOCUMENTS 8,040,623 B2 * 10/2011 Shyu ........................ G02B 7/08
310/323.02
8,279,541 B2 * 10/2012 Henderson ............. G02B 7/022
359/811
(Continued)

FOREIGN PATENT DOCUMENTS

| JP | 2005-157290 A | 6/2005 |
|----|---------------|--------|
| JP | 2007-155886 A | 6/2007 |

(Continued)

OTHER PUBLICATIONS

International Search Report from International Application No. PCT/JP2016/002556 dated Jul. 26, 2016.

*Primary Examiner* — Arnel C Lavarias
(74) *Attorney, Agent, or Firm* — Brundidge & Stanger, P.C.

(57) ABSTRACT

The lens drive device is provided with an autofocus drive unit and a shake correcting drive unit. A second support for supporting a shake correction moving part in a state separated from a shake correction fixed part has a power supply line for supplying power to an autofocus coil from the shake correction fixed part. An autofocus moving part has power supply line connection parts for electrically connecting the autofocus coil and the power supply line at two positions opposite each other in a first direction orthogonal to the optical axis. First supports for supporting the autofocus moving part in a state separated from an autofocus fixed part are disposed at two positions opposite each other in a second direction orthogonal to the optical axis of the autofocus (Continued)

moving part, and have a self-holding mechanism for holding the position of the autofocus moving part in the optical axis direction.

7 Claims, 10 Drawing Sheets

(51) Int. Cl.
  *G03B 15/00* (2006.01)
  *G03B 5/04* (2006.01)
  *H02K 41/035* (2006.01)
  *H04N 5/225* (2006.01)
  *H04N 5/232* (2006.01)
  *G02B 7/08* (2006.01)
(52) U.S. Cl.
  CPC .............. *G03B 5/04* (2013.01); *G03B 13/36* (2013.01); *G03B 15/00* (2013.01); *H02K 41/0356* (2013.01); *H04N 5/2253* (2013.01); *H04N 5/2257* (2013.01); *H04N 5/23287* (2013.01); *G03B 2205/0015* (2013.01); *G03B 2205/0069* (2013.01)
(58) Field of Classification Search
  USPC ....... 359/554, 557; 250/201.1, 201.2, 201.4; 348/208.99, 208.2, 208.12; 396/52, 55
  See application file for complete search history.

(56) References Cited

U.S. PATENT DOCUMENTS

| 10,281,691 | B2* | 5/2019 | Sugawara | G02B 7/04 |
| 2007/0127325 | A1 | 6/2007 | Yamashita | |
| 2012/0026611 | A1 | 2/2012 | Hu et al. | |
| 2016/0178923 | A1* | 6/2016 | Hayashi | G02B 7/04 |
| | | | | 359/557 |
| 2016/0178924 | A1* | 6/2016 | Lim | G02B 7/08 |
| | | | | 359/557 |
| 2016/0241787 | A1* | 8/2016 | Sekimoto | H04N 5/2257 |
| 2016/0299312 | A1* | 10/2016 | Cho | G02B 7/08 |
| 2017/0285362 | A1* | 10/2017 | Hu | G02B 27/646 |

FOREIGN PATENT DOCUMENTS

| JP | 2012-027433 A | 2/2012 |
| JP | 2012-047834 A | 3/2012 |
| JP | 2012-123047 A | 6/2012 |
| JP | 2013-148699 A | 8/2013 |
| JP | 2013-210550 A | 10/2013 |
| JP | 2015-034910 A | 2/2015 |
| JP | 2015-034912 A | 2/2015 |
| JP | 2015-141389 A | 8/2015 |

* cited by examiner

LENS DRIVE DEVICE, CAMERA MODULE, AND CAMERA MOUNTED DEVICE HAVING AUTOFOCUS FUNCTION

TECHNICAL FIELD

The present invention relates to a lens driving device, camera module, and camera-mounted device that include an autofocus function and a shake-correcting function.

BACKGROUND ART

In general, a small-sized camera module is mounted in mobile terminals such as smartphones. A lens driving device having an autofocus function of automatically performing focusing during capturing of a subject (hereinafter referred to as "AF (Auto Focus) function") and a shake-correcting function (hereinafter referred to as "OIS (Optical Image Stabilization) function") for reducing irregularities of an image by correcting shake (vibration) caused during capturing of an image is applied in such a camera module (see e.g. Patent Literature (hereinafter referred to as "PTL") 1).

The lens driving device having the autofocus and shake-correcting functions is provided with an auto-focusing driving part for moving a lens part in the optical-axis direction (hereinafter referred to as "AF driving part") and a shake-correcting driving part for swaying a lens part in a plane orthogonal to the optical-axis direction (hereinafter referred to as "OIS driving part").

The AF driving part includes, for example, an auto-focusing coil (hereinafter referred to as "AF coil") disposed at the periphery of the lens part, an auto-focusing magnet (hereinafter referred to as "AF magnet") disposed to be radially spaced apart from the AF coil, and an elastic supporting part (for example, plate spring) for elastically supporting an autofocus movable part (hereinafter referred to as "AF movable part") including the lens part and the AF coil, for example, with respect to an autofocus fixing part (hereinafter referred to as "AF fixing part") including the AF magnet. Focusing is automatically carried out by moving the AF movable part with respect to the AF fixing part in the optical-axis direction by utilizing a driving force of a voice coil motor composed of the AF coil and the AF magnet. In the meanwhile, the AF fixing part may include the AF coil and the AF movable part may include the AF magnet.

The OIS driving part includes a shake-correcting magnet (hereinafter referred to as "OIS magnet") disposed, for example, to the AF driving part, a shake-correcting coil (hereinafter referred to as "OIS coil") disposed to be spaced apart from the OIS magnet, and a supporting part configured to support a shake-correcting movable part (hereinafter referred to as "OIS movable part") including the AF driving part and the OIS magnet with respect to a shake-correcting fixing part (hereinafter referred to as "OIS fixing part") including the OIS coil. A shake correction is performed by swaying the OIS movable part with respect to the OIS fixing part in a plane orthogonal to the optical-axis direction by utilizing a driving force of a voice coil motor composed of the OIS magnet and the OIS coil (so-called barrel shift system). The OIS magnet can also serve as the AF magnet, and in this case, the miniaturization and/or the height reduction of the lens driving device can be achieved. In addition, a suspension wire is employed as the supporting part configured to support the OIS movable part with respect to the OIS fixing part, for example.

CITATION LIST

Patent Literature

PTL 1
Japanese Patent Application Laid-Open No. 2013-210550
PTL 2
Japanese Patent Application Laid-Open No. 2007-155886

SUMMARY OF INVENTION

Technical Problem

When automatic focusing is performed in the above-mentioned lens driving device, the AF coil is energized. In a non-energization state where automatic focusing is not carried out, the AF movable part is returned to an initial state (for example, a state where the AF movable part is suspended between an infinity position and a macro position), and is held by the elastic supporting part. Accordingly, during when a subject is followed and focusing on the subject is performed, such as during video shooting, that is, during when the AF movable part needs to be held displaced from the initial state, the AF coil needs to be kept energized. This is a factor causing an increase in power consumption. In particular, in a camera module in which a large high-pixel-density imaging device is employed in order to enable capturing a high-resolution image, the increase in power consumption is greater since the movement stroke of the lens driving device is larger.

In the meanwhile, a lens driving device provided with a self-holding mechanism in which the position of an AF movable part (lens holder) is held by a magnetic member is disclosed in PTL 2. It is, however, difficult to apply the self-holding mechanism disclosed in PTL 2 since a disposition space is significantly limited in lens driving devices having an AF function and an OIS function.

An object of the present invention is to provide a lens driving device, camera module, and camera-mounted device in which power consumption can be reduced.

Solution to Problem

A lens driving device according to the present invention includes an auto-focusing driving part including: an auto-focusing driving part including: an auto-focusing coil to be disposed at a periphery of a lens part; an auto-focusing magnet to be disposed to be radially spaced apart from the auto-focusing coil; and a first supporting part configured to support an autofocus movable part including the auto-focusing coil such that the autofocus movable part is spaced apart from an autofocus fixing part including the auto-focusing magnet in an optical-axis orthogonal direction, the auto-focusing driving part being configured to perform automatic focusing by moving the autofocus movable part with respect to the autofocus fixing part in an optical-axis direction by utilizing a driving force of a voice coil motor composed of the auto-focusing coil and the auto-focusing magnet, and the lens driving device further includes a shake-correcting driving part including: a shake-correcting magnet to be disposed in a shake-correcting movable part including the auto-focusing coil and the auto-focusing magnet; a shake-correcting coil to be disposed to be spaced apart from the shake-correcting magnet; and a second supporting part configured to support the shake-correcting movable part such that the shake-correcting movable part is spaced apart from a shake-correcting fixing part including the shake-correcting coil in the optical-axis direction, the shake-correcting driving part being configured to perform shake correction by swaying the shake-correcting movable part with respect to the shake-correcting fixing part in a plane orthogonal to the optical-axis direction by utilizing a driving force of a voice coil motor composed of the shake-correcting coil and the shake-correcting magnet. In the lens driving device, the second supporting part includes a power-supply line for power supply from the shake-correcting fixing part to the auto-focusing coil, the autofocus movable part includes, at two places thereof opposite to each other in a first optical-axis orthogonal direction, power-supply-line connecting parts for electrical connection between an end of the auto-focusing coil and the power-supply line, and the first supporting part is disposed at each of two places of the autofocus movable part opposite to each other in a second optical-axis orthogonal direction different from the first optical-axis orthogonal direction, and the first supporting part includes a self-holding mechanism by which a position of the autofocus movable part along the optical-axis direction is held.

A camera module according to the present invention includes the lens driving device as described above, the lens part mounted on the autofocus movable part, and an image capturing part configured to capture a subject image imaged by the lens part.

A camera-mounted device according to the present invention is an information device or a transporting device, and includes the camera module as described above.

Advantageous Effects of Invention

According to the present invention, a first supporting part includes a self-holding mechanism, so that an autofocus movable part can be held displaced from an initial state without an auto-focusing coil being kept energized. Therefore, power consumption of a lens driving device can be reduced remarkably.

DESCRIPTION OF EMBODIMENTS

In the following, an embodiment of the present invention is described in detail with reference to the drawings.

Figures 1A, 1B:
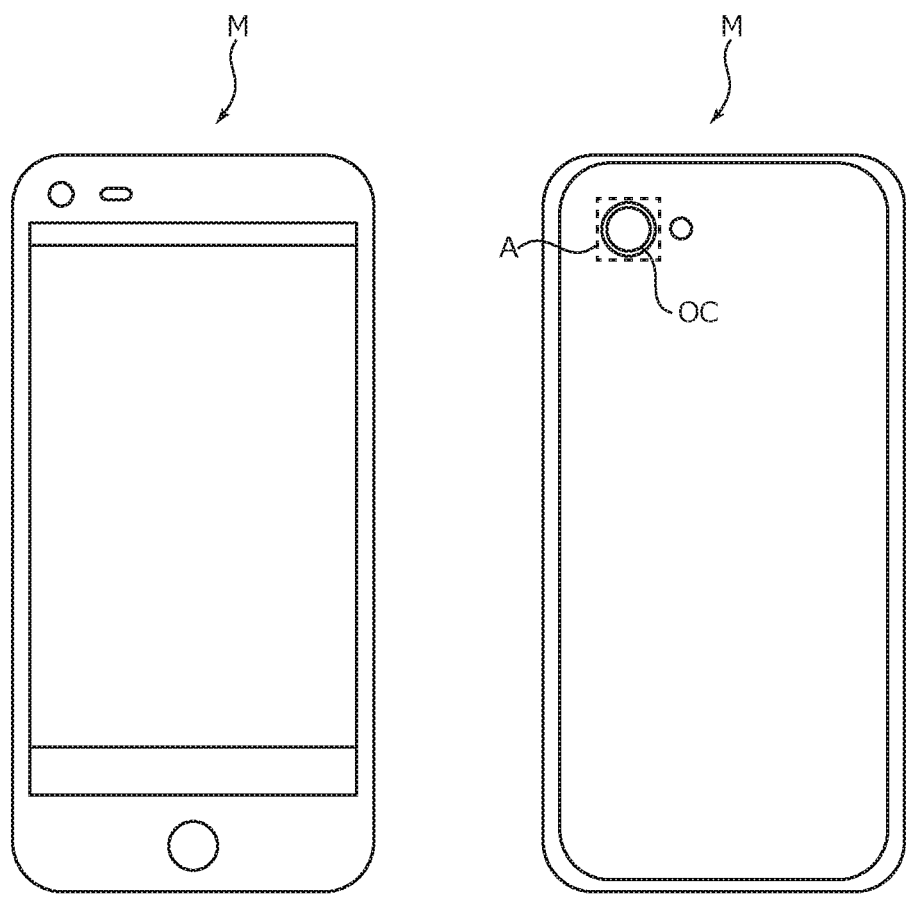
FIGS. 1A and 1B illustrate a smartphone in which a camera module according to an embodiment of the present invention is mounted.

FIGS. 1A and 1B illustrate smartphone M (camera-mounted device) in which camera module A according to an embodiment of the present invention is mounted. FIG. 1A is a front view of smartphone M, and FIG. 1B is a rear view of smartphone M.

Smartphone M is provided with camera module A, for example as back side camera OC. Camera module A has an autofocus function and a shake-correcting function, and captures an image without image blurring by automatically performing focusing at the time of capturing a subject and by correcting shake (vibration) caused at the time of capturing an image.

Figure 2:
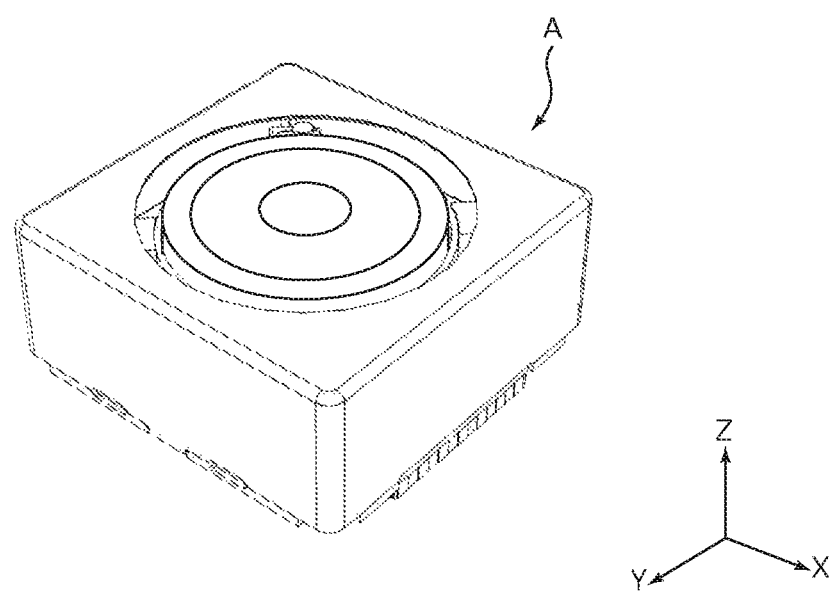
FIG. 2 is a perspective view of an external appearance of camera module.
Figure 3:
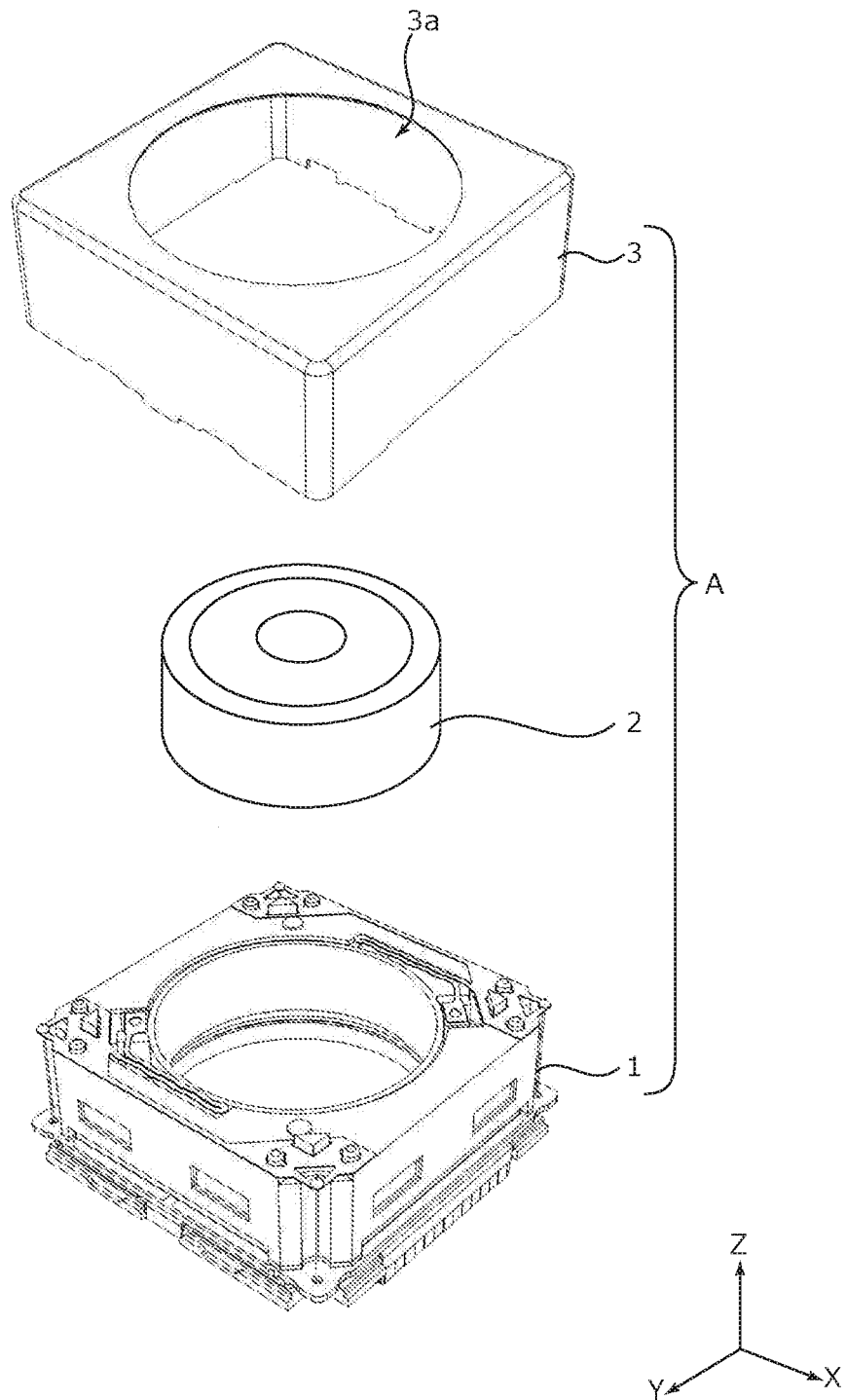
FIG. 3 is an exploded perspective view of the camera module.

FIG. 2 is a perspective view of an external appearance of camera module A. FIG. 3 is an exploded perspective view of camera module A. As illustrated in FIGS. 2 and 3, descriptions will be given for the present embodiment with an orthogonal coordinate system (X, Y, Z). In below-mentioned figures, descriptions will also be given with the orthogonal coordinate system (X, Y, Z). Camera module A is mounted such that the vertical direction (or horizontal direction) is the X direction, the horizontal direction (or vertical direction) is the Y direction, and the front-rear direction is the Z direction during actually capturing an image with smartphone M. That is, the Z direction is the optical-axis direction, the upper side in the figures is the light reception side in the optical-axis direction (also referred to as "macro position side"), and the lower side is the image formation side in the optical-axis direction (also referred to as "infinity position side"). In addition, the X and Y directions orthogonal to the optical-axis direction are referred to as "optical-axis orthogonal directions."

Camera module A includes lens part 2 composed of a cylindrical lens barrel and a lens housed therein, lens driving device 1 for an AF function and an OIS function, an image capturing part (not illustrated) configured to capture a subject image imaged by lens part 2, cover 3 entirely covering camera module A, and the like.

Cover 3 is a capped rectangular cylindrical member having a square shape in plan view as seen in the optical-axis direction, and has circular opening 3a in the top surface. Lens part 2 faces outside from this opening 3a. Cover 3 is placed on cover attachment portion 23d (see FIG. 7) of base 23, and is fixed, for example, adhesively to base 23. Note that cover 3 may be formed of a conductive material and may be grounded via OIS fixing part 20.

The image capturing part (not illustrated) includes an imaging device (not illustrated), and is disposed on the image formation side of lens driving device 1 in the optical-axis direction, that is, on the image formation side of OIS fixing part 20 in the optical-axis direction. The imaging device (not illustrated) is composed of, for example, a CCD (charge coupled device) image sensor, a CMOS (complementary metal oxide semiconductor) image sensor, or the like. The imaging device (not illustrated) captures a subject image imaged by lens part 2.

Figure 4:
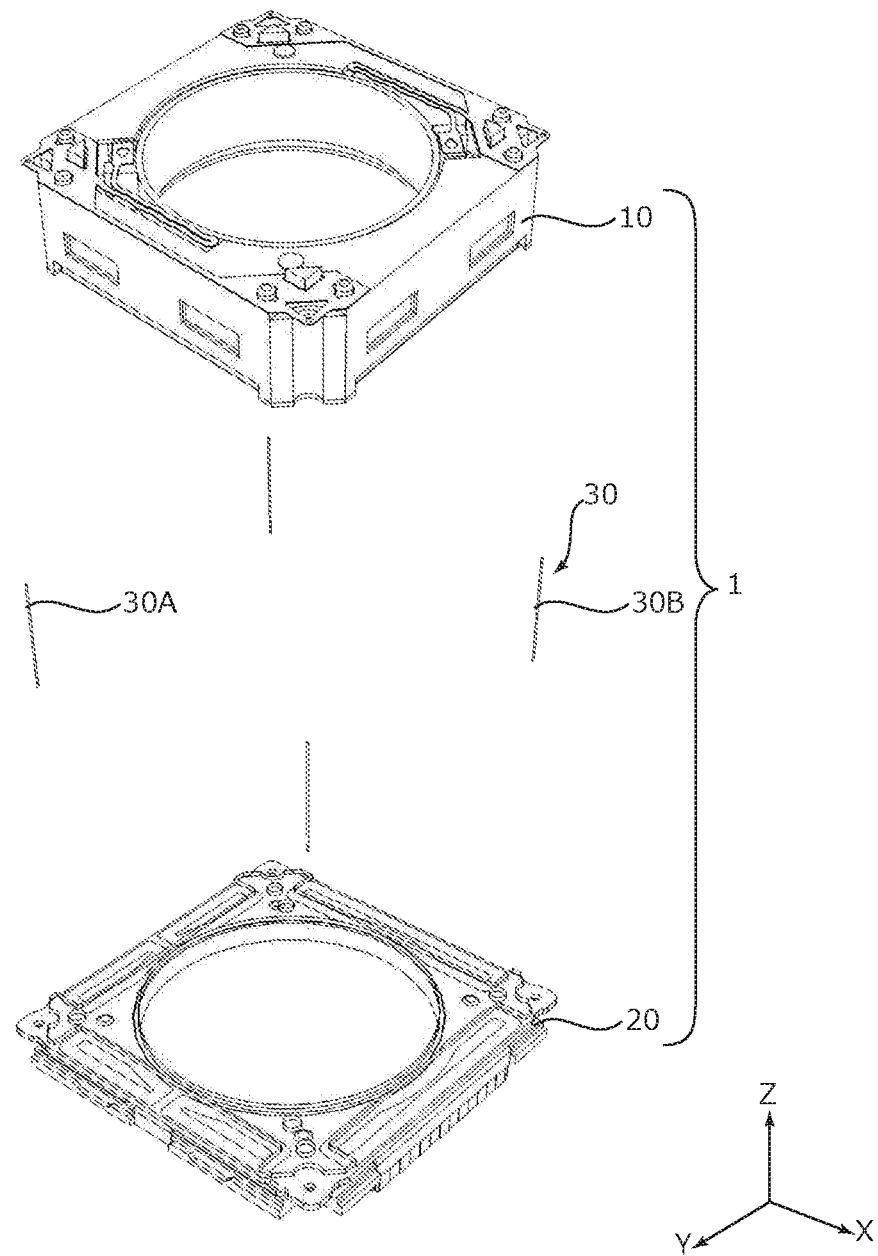
FIG. 4 is an exploded perspective view of a lens driving device.

FIG. 4 is an exploded perspective view of lens driving device 1. As illustrated in FIG. 4, lens driving device 1 includes OIS movable part 10, OIS fixing part 20, OIS supporting part 30, and the like.

OIS movable part 10 includes an OIS magnet being a component of an OIS voice coil motor, and is swayed during shake correction in an optical-axis orthogonal plane which is a plane orthogonal to the optical axis. OIS fixing part 20 is a part including an OIS coil. That is, the moving-magnet system is employed in the OIS driving part of lens driving device 1. OIS movable part 10 is held to be spaced apart from OIS fixing part 20 by OIS supporting part 30 such that OIS movable part 10 is movable in the plane orthogonal to the optical-axis direction. In this embodiment, OIS movable part 10 is spaced apart from OIS fixing part 20 on the light reception side in the optical-axis direction.

OIS supporting part 30 supports OIS movable part 10 with respect to OIS fixing part 20. OIS supporting part 30 only have to be able to support OIS movable part 10 such that OIS movable part 10 is spaced apart from OIS fixing part 20. In this embodiment, OIS supporting part 30 is composed of four suspension wires extending in the optical-axis direction (hereinafter referred to as "suspension wires 30"). One ends (upper ends) of suspension wires 30 are fixed to OIS movable part 10 (to power-supply spring 13, see FIGS. 5 and 6), and the other ends (lower ends) are fixed to OIS fixing part 20 (to coil board 21, see FIG. 7). OIS movable part 10 is supported to be able to sway in the XY plane by suspension wires 30. Two suspension wires 30A and 30B of four suspension wires 30 are used as power-supply lines via which electric power is supplied from OIS fixing part 20 to AF coil 112 (see FIGS. 5 and 6). The number of suspension wires 30 is not limited to four, and may be more than four.

Figure 5:
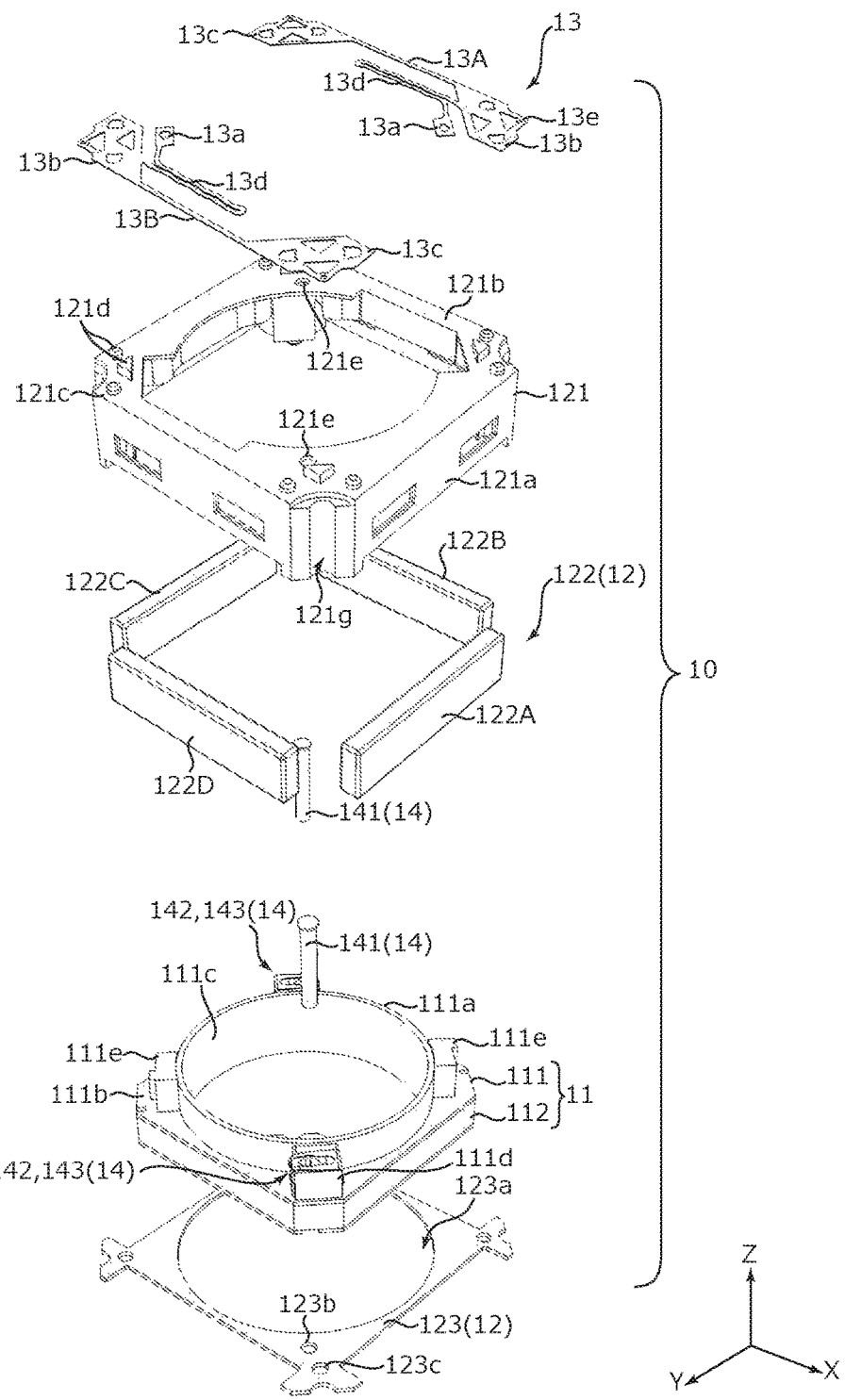
FIG. 5 is an exploded perspective view of an OIS movable part as seen from above.
Figure 6:
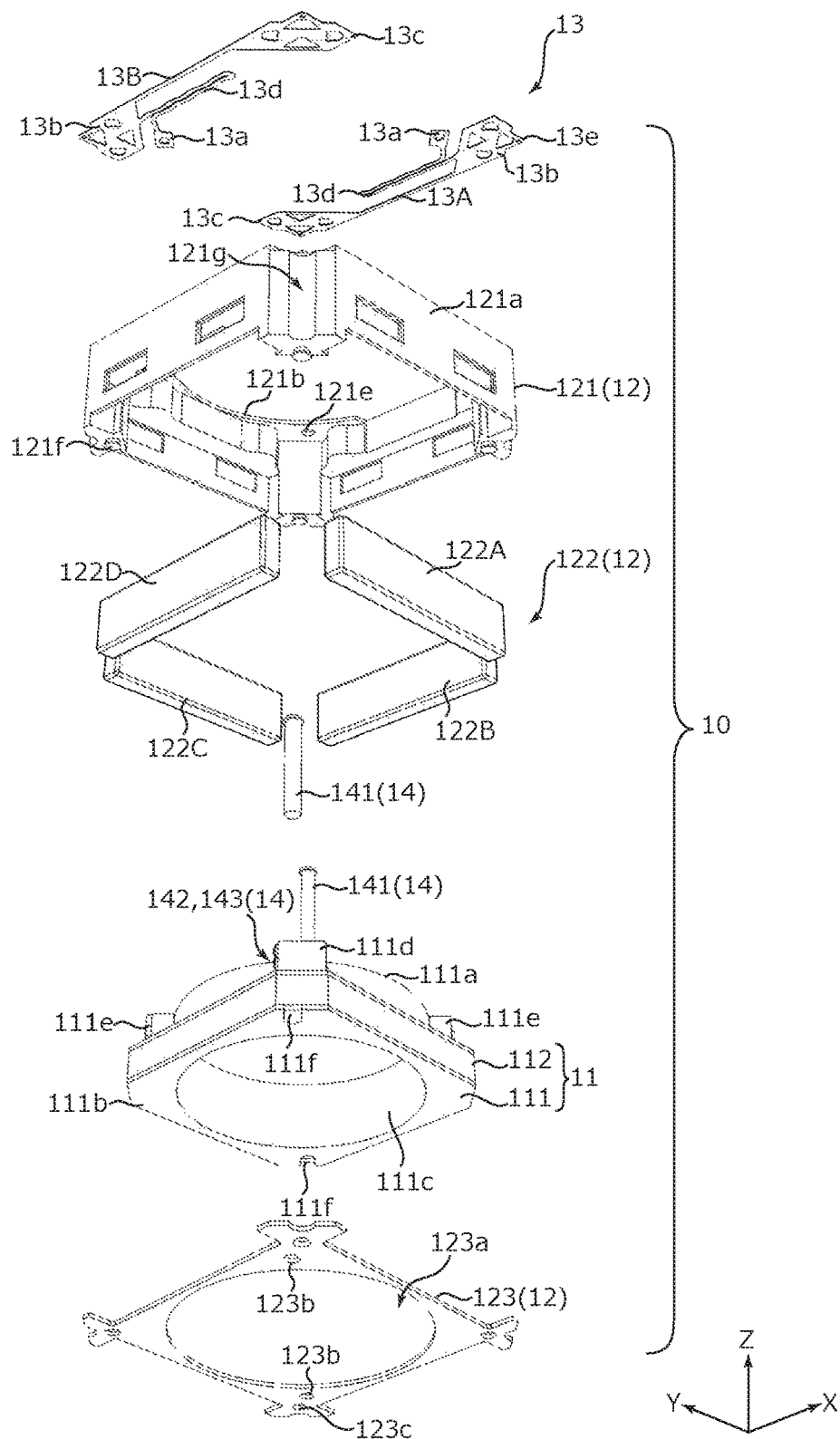
FIG. 6 is an exploded perspective view of the OIS movable part as seen from below.

FIGS. 5 and 6 are exploded perspective views of OIS movable part 10. FIG. 5 is the upper exploded perspective view seen from the light reception side in the optical-axis direction, and FIG. 6 is the lower exploded perspective view seen from the image formation side in the optical-axis direction.

As illustrated in FIGS. 5 and 6, OIS movable part 10 includes AF movable part 11, AF fixing part 12, power-supply spring 13, AF supporting parts 14, and the like. That is, OIS movable part 10 includes all components of the AF driving part of lens driving device 1. AF movable part 11 includes the AF coil being a component of the AF voice coil motor, and moves in the optical-axis direction during focusing. AF fixing part 12 is a part including the AF magnet. That is, the moving-coil system is employed in the AF driving part of lens driving device 1. AF movable part 11 is disposed to be radially inwardly spaced apart from AF fixing part 12, and is coupled with AF fixing part 12 by AF supporting parts 14.

AF movable part 11 includes lens holder 111 and AF coil 112.

Lens holder 111 includes cylindrical lens housing 111a and flange portion 111b protruding radially outward from lens housing 111a in a square shape. Lens part 2 (see FIG. 3) is fixed to inner peripheral surface 111c of lens housing 111a adhesively or by screwing. Flange portion 111b has a dented portion (whose reference numeral is omitted) at its outer peripheral surface, and AF coil 112 is wound at this dented portion (hereinafter referred to as "coil winding portion").

Pad housings 111d are disposed on the upper surface of flange portion 111b at two diagonally opposite corners, respectively. Pad housings 111d each have a U-shape in plan view, and each receive pad 143. Pad housings 111d have a shaft insertion hole 111f for insertion of shaft 141. Tying parts 111e are disposed on the upper surface of flange portion 111b at the other two diagonally opposite corners, respectively. Ends of AF coil 112 are tied to tying parts 111e.

AF coil 112 is an air-core coil to be energized during focusing. AF coil 112 is wound at the coil winding portion (whose reference numeral is omitted) of lens holder 111. The ends of AF coil 112 are pulled out from the upper cutouts (whose reference numeral is omitted) in flange portion 111b of lens holder 111, and are tied to tying parts 111e.

AF fixing part 12 includes magnet holder 121, magnet part 122, and shaft fixing cover 123.

Magnet holder 121 includes side frame 121a having a quadrangular shape, and top frame 121b projecting out inward from the upper edge of side frame 121a.

Four corner portions 121g of side frame 121a are formed to be dented radially inward in a circular arc shape. Suspension wires 30 are disposed at these portions (hereinafter referred to as "wire insertion portions 121g"). The topmost parts of wire insertion portions 121g are dented from the peripheral surface such that a gap is formed between wire insertion portions and power-supply spring 13.

Magnet part 122 is fixed, for example, adhesively to the inner surface of side frame 121a. At the four corners of the undersurface of side frame 121a, positioning bosses 121f protruding toward shaft fixing cover 123 (on the image formation side in the optical-axis direction) are disposed.

Top frame 121b has an opening (whose reference numeral is omitted) having a shape corresponding to lens housing 111a of lens holder 111 and to arm portions 13d of power-supply spring 13. Power-supply spring 13 is fixed to four corners 121c of the upper surface of top frame 121b (hereinafter referred to as "power-supply-spring fixing portions 121c"). Positioning bosses 121d protruding toward power-supply spring 13 (on the light reception side in the optical-axis direction) are disposed at power-supply-spring fixing portions 121c. Power-supply spring 13 is positioned by positioning bosses 121d. Top frame 121b has shaft insertion holes 121e for insertion of shafts 141 at two diagonally opposite corners.

Magnet part 122 is composed of four cuboid permanent magnets 122A to 122D. Magnet part 122 is disposed along the inner surface of side frame 121a of magnet holder 121. Magnet part 122 is magnetized such that magnetic fields radially traversing AF coil 112 are formed at AF coil 112. For example, magnet part 122 is magnetized such that the inner periphery side and the outer periphery side of magnet part 122 are set to N pole and S pole, respectively.

An AF voice coil motor is composed of magnet part 122 and coil part 112. In the present embodiment, magnet part 122 serves as both of the AF magnet and the OIS magnet.

Shaft fixing cover 123 has a shape corresponding to side frame 121a of magnet holder 121, and has circular opening 123a. Shaft fixing cover 123 is disposed on the image formation side of lens holder 121 in the optical-axis direction.

Shaft fixing cover 123 has shaft locking portions 123b for locking the lower ends of shafts 141. Positioning bosses 121f of magnet holder 121 are fit in fixing holes 123c of shaft fixing cover 123, so that shaft fixing cover 123 is positioned with respect to magnet holder 121, and is fixed thereto, for example, by thermal caulking.

Power-supply spring 13 elastically connects AF fixing part 12 (magnet holder 121) to AF movable part 11 (lens holder 111), and electrically connects suspension wires 30A and 30B to AF coil 112. Power supply spring 13 forms a part of the power-supply line via which electric power is supplied to AF coil 112 from OIS fixing part 20. Power-supply spring 13 is not required to have a function of supporting AF movable part 11, and therefore, its spring constant is preferably as small as possible.

Power-supply spring 13 is composed of two plate springs 13A and 13B disposed point-symmetrically with respect to the optical axis (hereinafter referred to as "power-supply springs 13A and 13B"). Power-supply springs 13A and 13B are made, for example, of a conductive material, such as beryllium copper, nickel copper, stainless steel, or the like.

Power-supply springs 13A and 13B are shaped, for example, by being punched out from one sheet metal, and have the square shape in plan view as a whole.

Power-supply springs 13A and 13B each include lens-holder holding portion 13a, magnet-holder holding portions 13b and 13c, and arm portion 13d.

Lens-holder holding portions 13a have a shape corresponding to tying part 111e of lens holder 111. The positioning bosses (not illustrated) of tying parts 111e are fit in the fixing holes (whose reference numeral is omitted) of lens-holder holding portions 13a, so that power-supply springs 13A and 13B are positioned with respect to lens holder 111, and are fixed thereto, for example, adhesively. In addition, lens-holder holding portions 13a are soldered to AF coil 112 tied to tying parts 111e. This brings about electrical connection between power-supply springs 13A and 13B and AF coil 112.

Magnet-holder holding portions 13b and 13c have a shape corresponding to power-supply-spring fixing portions 121c of magnet holder 121. Positioning bosses 121d of power-supply-spring fixing portions 121c are fit in the fixing holes (whose reference numeral is omitted) of magnet-holder holding portions 13b and 13c, so that power-supply springs 13A and 13B are positioned to magnet holder 121, and are fixed thereto, for example, adhesively.

Apical angle portions 13e of magnet-holder holding portions 13b and 13c serve as a wire connection portion to which each of suspension wires 30 is connected (hereinafter referred to as "wire connection portion 13e"). Wire connection portions 13e are located on the light reception side of wire insertion portions 121g of magnet holder 121 in the optical-axis direction.

In a state where power-supply springs 13A and 13B are attached to magnet holder 121, gaps are formed between wire connection portions 13e and magnet holder 121. A damper material (not illustrated) is disposed in these gaps such that suspension wires 30 are surrounded with the damper material. For example, an ultraviolet-curable silicone gel is applicable as the damper material. By interposing damper material (not illustrated) between power-supply springs 13A and 13B and magnet holder 121, the generation of unwanted resonance (high-order resonant mode) is reduced, so that operational stability can be ensured.

Wire connection portions 13e have a shape which easily deforms elastically. The impact of a fall is absorbed by bending of wire connection portions 13e and suspension wires 30. Thus, plastic deformation and/or rupture of suspension wire 30 due to the impact of a fall can be prevented effectively.

Arm portions 13d each couple lens-holder holding portion 13a with one of magnet-holder holding portions 13b. Arm portions 13d each have an elongated U-shape, and elastically deform when AF movable part 11 moves.

Figure 8:
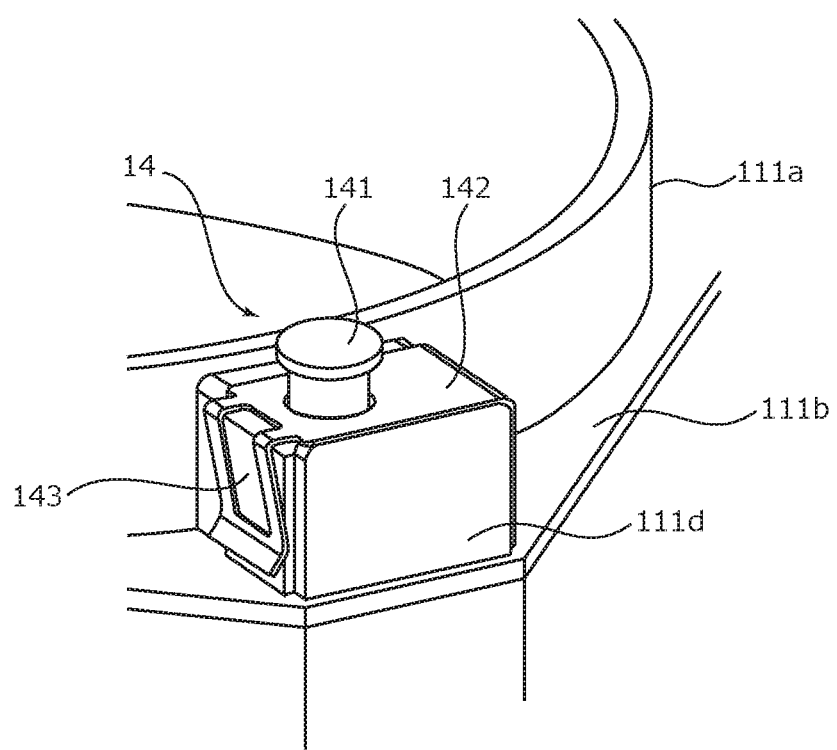
FIG. 8 is an enlarged view of an AF supporting part.
Figure 9:
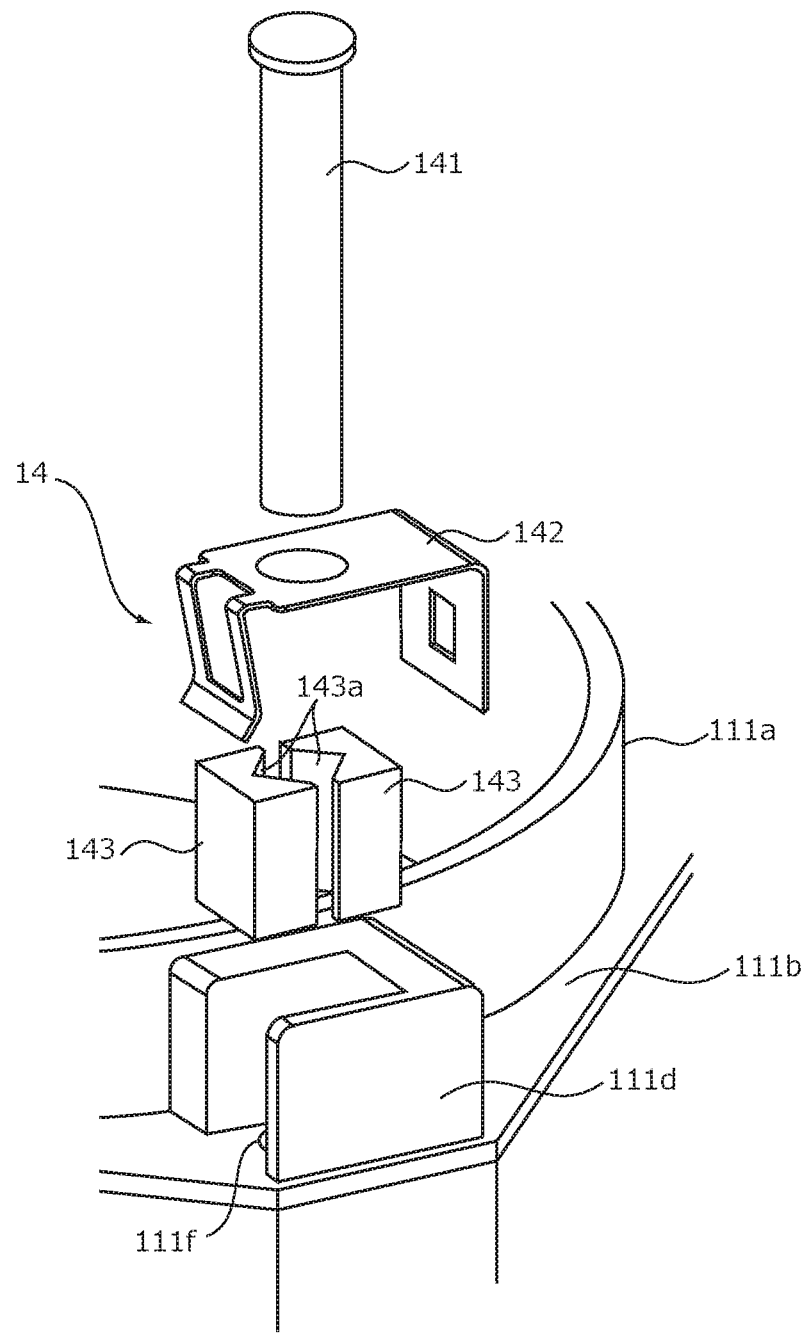
FIG. 9 is an exploded perspective view of the AF supporting part.

FIG. 8 is an enlarged view of AF supporting part 14. FIG. 9 is an exploded perspective view of AF supporting part 14. Note that magnet holder 121 is omitted in FIGS. 8 and 9. As illustrated in FIGS. 8 and 9, AF supporting parts 14 each include shaft 141, pressing spring 142, and pad 143.

Shaft 141 is inserted into shaft insertion hole 121e of magnet holder 121, passes through shaft insertion hole 111f of lens holder 111, and is fixed to shaft locking portion 123b of shaft fixing cover 123.

Shaft 141 is preferably made of a non-magnetic material (for example, austenitic stainless steel). This is because there is a risk that, if shaft 141 is made of a magnetic material, shaft 141 may have an unfavorable influence on the voice coil motor serving as the driving source of lens driving device 1.

Pad 143 is a pair of contact bodies between which shaft 141 is put. Pad 143 has V-shaped grooves 143a serving as a contact portion making contact with shaft 141, and supports shaft 141 at four points. Pad 143 is housed in pad housing 111d of lens holder 111 in a state where shaft 141 is put between the contact bodies of pad 143.

Pad 143 is preferably made of ultra high molecular weight polyethylene (UHPE). This increases the abrasion resistance of pad 143, so that the endurance of AF supporting part 14 is enhanced.

Pressing spring 142 is a plate spring which is fittingly attached to pad housing 111d of lens holder 111 and forces pad 143 housed in pad housing 111d toward shaft 141. By adjusting the forcing force to be generated by pressing spring 142, the frictional force which arises between shaft 141 and pad 143 can be adjusted appropriately. Pressing spring 142 and pad 143 are fixed to lens holder 111, for example, adhesively. In the meanwhile, a member other than a plate spring may be applicable as an elastic member which forces pad 143 toward shaft 141.

In this embodiment, the frictional force which arises between shaft 141 and pad 143 is preferably equal to or greater than a value of the dead weight of AF movable part 11 (including lens part 2)+2 G (G: Gravity). This ensures that the position of AF movable part 11 in the optical-axis direction of can be held. However, it is necessary to set the frictional force such that the slidability during the movement of AF movable part 11 along shaft 141 is not seriously impaired.

The frictional force arises between shaft 141 and pad 143, so that the position of AF movable part 11 in the optical-axis direction is held (self-holding mechanism) even without energizing AF coil 112. That is, pressing spring 142 and pad 143 are configured as a friction generating part.

In lens holder 111, AF supporting parts 14 are disposed opposite to each other in the second optical-axis orthogonal direction different from the first optical-axis orthogonal direction in which tying parts 111e are disposed opposite to each other. This means that, in the present embodiment, the self-holding mechanism is achieved by effectively utilizing a limited space of lens driving device 1 having the AF function and the OIS function.

Figure 7:
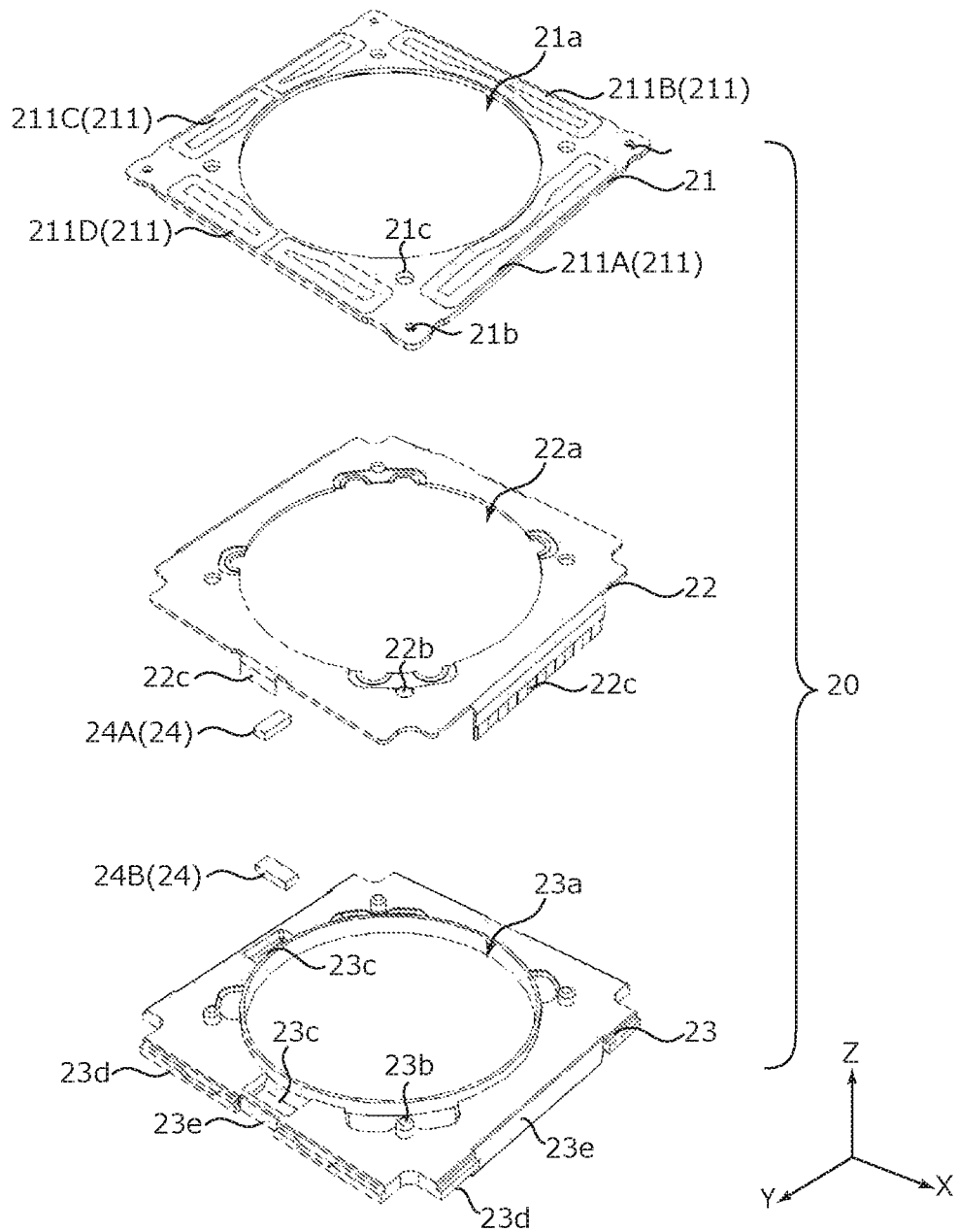
FIG. 7 is an exploded perspective view of an OIS fixing part.

FIG. 7 is an exploded perspective view of OIS fixing part 20. As illustrated in FIG. 7, OIS fixing part 20 includes coil board 21, sensor board 22, base 23, position-detecting part 24, and the like.

Coil board 21 is a board having a square shape in plan view, and has circular opening 21a at its center. Coil board 21 has, at its four corners, wire fixing holes 21b in which the other ends (lower ends) of suspension wires 30 are inserted. In addition, coil board 21 has positioning holes 21c at four places in a rim portion of opening 21a.

Coil board 21 includes OIS coil part 211 at a position corresponding to magnet part 122 in the optical-axis direction. OIS coil part 211 includes four OIS coils 211A to 211D corresponding to permanent magnets 122A to 122D. The sizes and positions of OIS coil part 211 and magnet part 122 are set such that the magnetic fields radiated from the bottom surfaces of permanent magnets 122A to 122D traverse the long side portions of OIS coils 211A to 211D in the Z direction. Magnet part 122 and OIS coil part 211 constitute the OIS voice coil motor.

As with coil board 21, sensor board 22 is a board having a square shape in plan view, and has circular opening 22a at its center. Sensor board 22 has positioning holes 22b in a rim portion of opening 22a at positions corresponding to positioning holes 21c of coil board 21. Sensor board 22 has, at the rim portion, engagement pieces 22c formed to be bent downwardly. A control terminal, earthing terminal, and the like may be disposed to engagement pieces 22c.

Sensor board 22 includes a power-source line (not illustrated) for feeding power to AF coil part 112 and OIS coil part 211, and a signal line (not illustrated) for a detection signal output from position-detecting part 24. Position-detecting part 24 for detecting a position of OIS movable part 10 in the XY plane is disposed on the undersurface of sensor board 22. Coil board 21 and sensor board 22 are pasted together and bonded by soldering such that their respective fixing holes 21c and 22b coincide with each other. In this way, OIS coil part 211 and wire fixing holes 21b of coil board 21 are electrically connected to the power-source line (not illustrated) of sensor board 22.

Position-detecting part 24 is composed of Hall elements 24A and 24B (magnetic sensors) which detect a magnetic field by utilizing the Hall effect, for example. Hall elements 24A and 24B are disposed on the undersurface of sensor board 22 substantially at the midpoints of two adjacent sides of sensor board 22, respectively. The position of OIS movable part 10 in the XY plane can be identified by detecting the magnetic field formed by magnet part 122 by Hall elements 24A and 24B. In the meanwhile, another magnet for position detection being different from magnet part 122 may be disposed to OIS movable part 10.

As with coil board 21, base 23 is a member having a square shape in plan view, and has circular opening 23a at its center. Base 23 includes Hall element housings 23c at positions in a rim portion of opening 23a corresponding to the positions of Hall elements 24A and 24B.

Base 23 includes positioning bosses 23b on the rim portion of opening 23a at positions corresponding to the positions of positioning holes 21c of coil board 21 and positioning holes 22b of sensor board 22. Base 23 includes, at the rim portion, cover attachment portions 23d on which cover 3 is placed. Longitudinal-directional-middle portions 23e of cover attachment portions 23d are dented radially (hereinafter referred to as "dented portions 23e").

Positioning bosses 23b of base 23 are fit in fixing holes 21c of coil board 21 and fixing holes 22b of sensor board 22, so that coil board 21 and sensor board 22 are positioned with respect to base 23. Engagement pieces 22c of sensor board 22 are then fittingly attached and fixed, for example, adhesively to dented portions 23e.

In lens driving device 1, the one ends (upper ends) of suspension wires 30 are inserted in wire connection portions 13e of power-supply springs 13A and 13B, and are fixed thereto by soldering. This forms electrical connection between suspension wires 30 and power-supply springs 13A and 13B.

The other ends (lower ends) of suspension wires 30 are inserted in wire fixing holes 21b of coil board 21, and are fixed thereto by soldering. This forms electrical connection between suspension wires 30 and the power-source line of sensor board 22. That is, electricity is supplied to AF coil 112 via suspension wires 30 and power-supply springs 13A and 13B.

When automatic focusing is performed in lens driving device 1, AF coil 112 is energized. The direction of current is controlled depending on toward which side of the macro position side and the infinity position side AF movable part 11 is to be moved. In addition, the magnitude of current is controlled depending on the moving distance of AF movable part 11.

When AF coil 112 is energized, a Lorentz force is generated at AF coil 112 by interaction between the magnetic field of magnet part 122 and the current flowing through AF coil 112. The direction of the Lorentz force is the direction (the Z direction) orthogonal to the direction of the magnetic field generated by magnet part 122 and the direction of the current flowing through AF coil 112. Since magnet part 122 is fixed, a reactive force acts on AF coil 112. With this reactive force serving as the driving force of the AF voice coil motor, AF movable part 11 including AF coil 112 slidingly moves in the optical-axis direction along shaft 141, so that focusing is performed.

The position of AF movable part 11 along the optical axis is held by the self-holding mechanism of AF supporting parts 14 during when AF movable part 11 is not energized. Accordingly, during when a subject is followed and focusing on the subject is performed, such as during video shooting, that is, during when AF movable part 11 needs to be held displaced from the initial state, the AF coil does not need to be kept energized, and only when focusing needs to be newly performed, AF coil 112 is energized. This allows significant reduction of the power consumption required for the focusing operation.

As described above, lens driving device 1 includes an auto-focusing driving part including: AF coil 112 disposed at the periphery of lens part 2; magnet part 122 (auto-focusing magnet) disposed to be radially spaced apart from AF coil 112; and AF supporting part 14 (first supporting part) configured to support AF movable part 11 including AF coil 112 such that AF movable part 11 is spaced apart from AF fixing part 12 including magnet part 122 in the optical-axis orthogonal direction, the auto focusing driving part being configured to perform automatic focusing by moving AF movable part 11 with respect to AF fixing part 12 in the optical-axis direction by utilizing the driving force of the voice coil motor composed of AF coil 112 and AF magnet 122.

In addition, lens driving device 1 includes a shake-correcting driving part including: magnet part 122 (shake-correcting magnet) disposed in OIS movable part 10 including AF coil 112 and magnet part 122; OIS coil part 211 (shake-correcting coil) disposed to be spaced apart from magnet part 122; and suspension wire 30 (second supporting part) configured to support OIS movable part 10 such that OIS movable part 10 is spaced apart from OIS fixing part 20 including OIS coil part 211 in the optical-axis direction, the shake-correcting driving part being configured to perform shake correction by swaying OIS movable part 10 with respect to OIS fixing part 20 in the plane orthogonal to the optical-axis direction by utilizing the driving force of the voice coil motor composed of OIS coil part 211 and magnet part 122.

Suspension wire 30 (second supporting part) includes suspension wires 30A and 30B (power-supply lines) for power supply from OIS fixing part 20 to AF coil 112. AF movable part 11 includes, at two places opposite to each other in the first optical-axis orthogonal direction, tying parts 111e (power-supply-line connecting parts) for electrically connecting the ends of AF coil 112 to suspension wires 30A and 30B. AF supporting parts 14 (first supporting part) are disposed respectively at two places in AF movable part 11 opposite to each other in the second optical-axis orthogonal direction, and include the self-holding mechanism by which the position of AF movable part 11 along the optical-axis direction is held.

According to lens driving device 1, AF supporting parts 14 (first supporting part) are provided with the self-holding mechanism, so that AF movable part 11 can be held displaced from the initial state without AF coil 112 being kept energized. Therefore, the power consumption of the lens driving device can be reduced remarkably.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, in place of AF supporting part 14 in the embodiment, a configuration including a shaft made of a magnetic material and a self-holding magnet may be employed, and the attracting force of the self-holding magnet may be utilized to generate a frictional force. In this case, care should be taken since a magnetic interference occurs between the self-holding magnet and a driving magnet (magnet part 122).

Although the embodiment has been described by mentioning a smartphone as an example of a camera-mounted device having camera module A, the present invention is applicable to a camera-mounted device serving as an information apparatus or a transport apparatus. The camera-mounted device serving as an information apparatus is an information apparatus including a camera module and a control section that processes image information obtained with the camera module, and examples of such a camera-mounted device include a camera-equipped mobile phone, a note-type personal computer, a tablet terminal, a mobile game machine, a web camera, and a camera-equipped in-vehicle apparatus (for example, a rear-view monitor apparatus or a drive recorder apparatus). In addition, the camera-mounted device serving as a transport apparatus is a transport apparatus including a camera module and a control section that processes an image obtained with the camera module, and examples of such a camera-mounted device include an automobile.

Figure 10A:
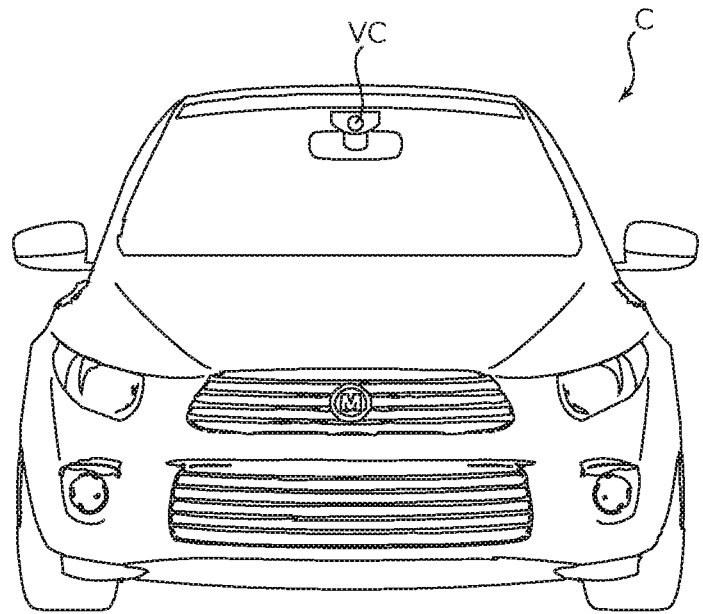
FIGS. 10A and 10B illustrate an automobile as a camera-mounted device in which an in-vehicle camera module is mounted.
Figure 10B:
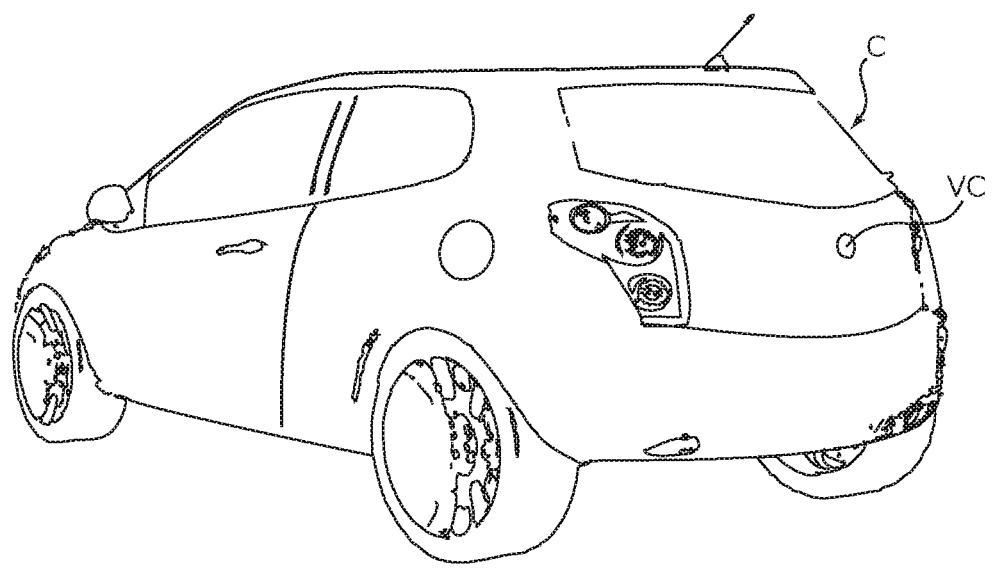

FIGS. 10A and 10B illustrate automobile C serving as a camera-mounted device in which an in-vehicle camera module VC (Vehicle Camera) is mounted. FIG. 10A is a front view of vehicle C and FIG. 10B is a rear perspective view of vehicle C. In automobile C, camera module A described in the embodiment is mounted as in-vehicle camera module VC. As illustrated in FIGS. 10A and 10B, in-vehicle camera module VC may, for example, be attached to the windshield so as to face forward, or to the rear gate so as to face backward. Onboard camera module VC is used for rear monitoring, drive recording, collision avoidance control, automatic drive control, and the like.

The embodiment disclosed herein is merely an exemplification in every respect and should not be considered as limitative. The scope of the present invention is specified by the claims, not by the above-mentioned description. The scope of the present invention is intended to include all modifications in so far as they are within the scope of the appended claims or the equivalents thereof.

This application is entitled to and claims the benefit of Japanese Patent Application No. 2015-109784 dated May 29, 2015, the disclosure of which including the specification, drawings and abstract is incorporated herein by reference in its entirety.

REFERENCE SIGNS LIST

1 Lens driving device
2 Lens part
3 Cover
10 OIS movable part (shake-correcting movable part)
11 AF movable part (autofocus movable part)
111 Lens holder
112 AF coil (auto-focusing coil)
12 AF fixing part (autofocus fixing part)
121 Magnet holder
122 Magnet part (auto-focusing magnet, shake-correcting magnet)
123 Shaft fixing cover
13, 13A, 13B Power-supply spring
14 AF supporting part (first supporting part)
141 Shaft
142 Pressing spring (friction generating part)
143 Pad (friction generating part)
20 OIS fixing part (shake-correcting fixing part)
21 Coil board
211 OIS coil part
22 Sensor board
23 Base
24 Position-detecting part
30 OIS supporting part (second supporting part)
M Smartphone (camera-mounted device)
A Camera module

The invention claimed is:

1. A lens driving device comprising:
an auto-focusing driving part including:
 an auto-focusing coil to be disposed at a periphery of a lens part;
 an auto-focusing magnet to be disposed to be radially spaced apart from the auto-focusing coil; and
 a first supporting part configured to support an autofocus movable part including the auto-focusing coil such that the autofocus movable part is spaced apart from an autofocus fixing part including the auto-focusing magnet in an optical-axis orthogonal direction, the auto-focusing driving part being configured to perform automatic focusing by moving the autofocus movable part with respect to the autofocus fixing part in an optical-axis direction by utilizing a driving force of a voice coil motor composed of the auto-focusing coil and the auto-focusing magnet; and
a shake-correcting driving part including:
 a shake-correcting magnet to be disposed in a shake-correcting movable part including the auto-focusing coil and the auto-focusing magnet;
 a shake-correcting coil to be disposed to be spaced apart from the shake-correcting magnet; and
 a second supporting part configured to support the shake-correcting movable part such that the shake-correcting movable part is spaced apart from a shake-correcting fixing part including the shake-correcting coil in the optical-axis direction, the shake-correcting driving part being configured to perform shake correction by swaying the shake-correcting movable part with respect to the shake-correcting fixing part in a plane orthogonal to the optical-axis direction by utilizing a driving force of a voice coil motor composed of the shake-correcting coil and the shake-correcting magnet, wherein:

the optical-axis orthogonal direction includes a first optical-axis orthogonal direction and a second optical-axis orthogonal direction different from the first optical-axis orthogonal direction, the second supporting part includes a power-supply line for power supply from the shake-correcting fixing part to the auto-focusing coil, the autofocus movable part includes, at two places thereof opposite to each other in the first optical-axis orthogonal direction, power-supply-line connecting parts for electrical connection between an end of the auto-focusing coil and the power-supply line, and the first supporting part is disposed at each of two places of the autofocus movable part opposite to each other in the second optical-axis orthogonal direction, and the first supporting part includes a self-holding mechanism by which a position of the autofocus movable part along the optical-axis direction is held.

2. The lens driving device according to claim 1, wherein: the first supporting part includes:

a shaft to be inserted in the autofocus movable part along the optical-axis direction and to be fixed to the autofocus movable part, and a friction generating part to be fixed to the autofocus movable part, the friction generating part being configured to exert a frictional force between the friction generating part and the shaft, wherein the autofocus movable part is slidingly moved along the shaft, and the position of the autofocus movable part along the optical-axis direction is held by the frictional force between the shaft and the friction generating part.

3. The lens driving device according to claim 2, wherein: the shaft is formed from a non-magnetic material.

4. The lens driving device according to claim 2, wherein: the friction generating part includes pads between which the shaft is put, and an elastic member that forces the pads toward the shaft.

5. The lens driving device according to claim 4, wherein: the pads are formed from ultra high molecular weight polyethylene (UHPE).

6. A camera module comprising:
the lens driving device according to claim 1;
the lens part mounted in the lens driving device; and
an image capturing part configured to capture a subject image imaged by the lens part.

7. A camera-mounted device that is an information device or a transporting device, the camera-mounted device comprising:
the camera module according to claim 6.

* * * * *